March 14, 1950

P. A. NEELY 2,500,319

TIRE LOOSENING LEVER

Filed Sept. 18, 1945

INVENTOR.
Peter A. Neely
BY
Homer P. Swart
Attorney

Patented Mar. 14, 1950

2,500,319

UNITED STATES PATENT OFFICE 2,500,319

TIRE LOOSENING LEVER

Peter A. Neely, Denver, Colo.

Application September 18, 1945, Serial No. 616,989

1 Claim. (Cl. 157—1.17)

This invention relates to tools, primarily for shop use, adapted to facilitate detachment and ultimate separation of pneumatic tire casings from their wheel mountings, and has as an object to provide an improved tool operable on a dismounted, tire-carrying wheel to initially disengage the tire casing from its associated mounting.

A further object of the invention is to provide an improved tool conveniently operable to disengage and hold away a tire casing bead from its associated mounting without injury or damage to the casing.

A further object of the invention is to provide an improved tire casing detaching tool adapted for efficient use on and with a plurality of tire and mounting sizes.

A further object of the invention is to provide an improved construction and arrangement of elements constituting a tire casing detaching tool.

A further object of the invention is to provide an improved tire casing detaching tool susceptible of manipulation by but one hand of an operator, thereby freeing the operator's other hand for the insertion and manipulation of subsequently-effective tire removing tools and agents.

A further object of the invention is to provide an improved tire casing detaching tool that is simple and inexpensive of manufacture, sturdy and durable in construction, efficiently effective in use, and convenient of manipulation throughout a wide range of specific applications.

With the foregoing and other objects in view, my invention consists in the construction, arrangement, and combination of elements hereinafter set forth, pointed out in my claims, and illustrated by the accompanying drawing, in which—

Figure 1:
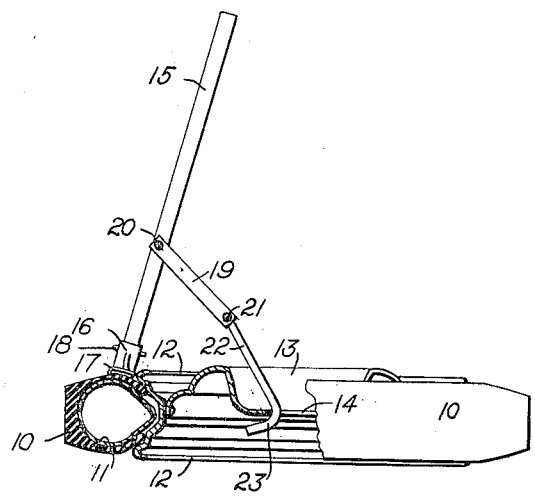
Figure 3:
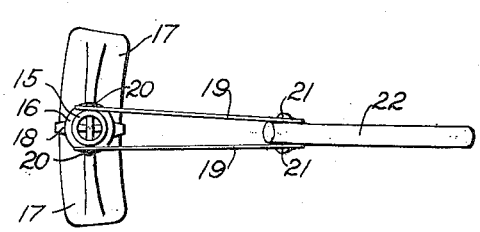
Figure 2:
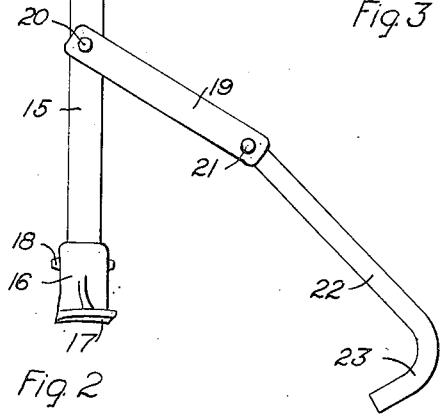

Figure 1 is a side elevation of the improved tool as applied to and in position for practical use on a typical wheel-mounted tire casing, a portion of the casing and its mounting being shown in section to facilitate understanding of the illustrated relationships and a portion of the tool handle being broken away to conserve space. Figure 2 is a side elevation, on an enlarged scale, of the tool shown in Figure 1 removed from its operating association. Figure 3 is a top plan view of the showing of Figure 2.

The operative association of tire casings with rigid, non-separable wheel rims, as currently practiced, gives rise to difficulties inherent in the separation and removal of mounted casings from their engaged rims, one of said difficulties being the reluctance with which casing side walls, and particularly the beads thereof, separate from the adjacent rim margins to open a passage wherethrough pry levers and tools may be inserted to lift the bead over the rim margin, even after complete deflation of the tire. While the noted difficulty is characteristic of most tire and wheel sizes and constructions in general use, it is presented in particularly aggravated degree by stiff-walled, heavy-duty casings, such as are used on trucks, buses, and the like, and hence the instant invention is directed to the provision of a tool designed to obviate and overcome the specific difficulty mentioned in a convenient and efficient manner free from damaging effect on the casings to which it is applied.

As shown in the drawing, the numeral 10 designates a typical pneumatic tire casing equipped with the usual inner tube 11 and mounted on the typical rim 12 of a conventional vehicle wheel 13, whereof the central, hub-engaging aperture 14 is open when the said wheel is dismounted, as is now customary in tire changing and working operations. The dismounted wheel 13 carrying the tire casing 10 is disposed to lie flat on a floor or other supporting surface with its tube 11 deflated, either side of said wheel being initially uppermost, in which position of the wheel and mounted tire the improved tool is applied to initiate tire casing detachment and to facilitate casing separation and removal from its mounting.

The elements of the improved tool are operatively associated with and carried in a unitary assembly by a straight, rigid, conveniently elongate bar or lever 15, preferably in the form of a metal tube to provide maximum strength in proportion to weight, whereof the lower end telescopically engages and seats within a recessed boss 16 upstanding centrally from an integrally-associated shoe 17 projecting, preferably arcuately, similarly from opposite sides of said boss to dispose the substantially flat shoe under surface in perpendicular relation with the boss and lever coincident axes. Engaged portions of the lever 15 and boss 16 may be permanently interconnected, as by means of welding, or a pin, rivet, or bolt 18 may removably and replaceably engage therethrough to interconnect said elements for actuation as a rigid unit. At a convenient distance above the boss 16 and shoe 17, a pair of identical, straight links 19 is embracingly hinged at one end, as by means of a pin, rivet, or bolt 20, to and exteriorly of the lever 15 for oscillation in a vertical arc defining a plane substantially perpendicular to the direction of shoe 17 extension laterally of said lever, and the ends of said links remote from said lever embracingly engage against opposite sides of and are hingedly connected, as by means of a pin, rivet, or bolt 21, with an end portion of a rigid rod 22, straight throughout the major portion of its length, whereof the outer or free end is formed as a hook 23 opening toward the shoe 17. The connection of the links 19 with the lever 15 is preferably at a distance above the shoe 17 somewhat greater than the length of said links, and the effective length of the rod 22 and its hook 23 is preferably equal to or greater than the link length, so that variable operating distances attaining considerable magnitude are available between the shoe 17 and the hook 23 when the latter is extended relative to the lever 15.

In the use and operation of the improved tool for the purpose set forth, the upper portion of the lever 15 is grasped by an operator and the under surface of the shoe 17 engaged against the tire casing side margin closely adjacent the wheel rim 12 with the lever 15 in upright extension above the tire. The lever is then tilted inwardly of and above the tire and wheel and the hook 23 entered through and engaged with the margin of the wheel aperture 14, as shown in Figure 1, whereafter manual pressure applied to swing the lever 15 upward end outwardly relative to the tire and wheel operates about the hook 23 engagement as a fulcrum to strongly depress the shoe 17 and thereby force the engaged tire casing portion inwardly away from its adjacent mounting rim; the pressure exerted by said shoe readily overcoming any adhesion between casing bead and rim as well as the normal casing resistance to deformation. With the tire casing broken away from its rim by the improved tool in the manner above set forth, a space is opened between the tire casing bead and the rim outer flange wherethrough a lever-type tool may readily be inserted for use in prying the casing bead upwardly over and into fully released relation with the rim flange, as is common practice.

To obviate possible damage to the tire casing wall engaged thereby, marginal corners of the shoe 17 are suitably smoothed and rounded, and the opposite ends of said shoe may be curved upwardly away from the major area of the shoe under surface, as indicated in the drawing.

Since many changes, variations, and modifications in the specific form, construction, and arrangement of the elements shown and described may be had without departing from the spirit of my invention, I wish to be understood as being limited solely by the scope of the appended claim, rather than by any details of the illustrative showing and foregoing description.

I claim as my invention:

A tool of the character and for the purpose described, comprising a straight, rigid lever, a substantially flat, elongate, tire-engaging shoe of relatively extensive area fixed on one end, perpendicular to and projecting laterally beyond opposite sides of said lever, paired links embracingly hinged at one end to said lever above said shoe for oscillation in a plane substantially perpendicular to the length of the latter, and a terminally-hooked extension hingedly associated between the ends of said links remote from said lever and for oscillation in the same plane with said links.

PETER A. NEELY.

REFERENCES CITED

The following references are of record in the file of this patent:

UNITED STATES PATENTS

| Number | Name | Date |
| --- | --- | --- |
| 1,559,355 | Oakley | Oct. 27, 1925 |
| 1,758,264 | Senger | May 13, 1930 |
| 2,241,886 | Pearce | May 13, 1941 |
| 2,305,886 | Mahler | Dec. 22, 1942 |
| 2,340,586 | Freed | Feb. 1, 1944 |

FOREIGN PATENTS

| Number | Country | Date |
| --- | --- | --- |
| 386,915 | France | Apr. 24, 1908 |
| 350,652 | Great Britain | June 18, 1931 |

OTHER REFERENCES

Popular Mechanics, page 684, May 1941.